(12) United States Patent
Moreau et al.

(10) Patent No.: US 11,156,713 B2
(45) Date of Patent: Oct. 26, 2021

(54) METHOD FOR ESTIMATING A PRECIPITATION RATE, IN PARTICULAR FOR RAIN OR SNOW

(71) Applicant: Novimet, Montigny-le-Bretonneux (FR)

(72) Inventors: Emmanuel Moreau, Paris (FR); Erwan Le Bouar, Montreuil (FR); Jacques Testud, Paris (FR)

(73) Assignee: Novimet

( * ) Notice: Subject to any disclaimer, the term of this patent is extended or adjusted under 35 U.S.C. 154(b) by 133 days.

(21) Appl. No.: 16/476,772

(22) PCT Filed: Jan. 9, 2018

(86) PCT No.: PCT/EP2018/050470
§ 371 (c)(1),
(2) Date: Sep. 4, 2019

(87) PCT Pub. No.: WO2018/127605
PCT Pub. Date: Jul. 12, 2018

(65) Prior Publication Data
US 2020/0271778 A1  Aug. 27, 2020

(30) Foreign Application Priority Data
Jan. 9, 2017  (FR) ........................ 1750186

(51) Int. Cl.
*G01S 13/95* (2006.01)
*G01W 1/14* (2006.01)
(52) U.S. Cl.
CPC ............ *G01S 13/95* (2013.01); *G01W 1/14* (2013.01)
(58) Field of Classification Search
CPC .................. G01S 13/95; G01W 1/14
(Continued)

(56) References Cited

U.S. PATENT DOCUMENTS 6,473,026 B1 * 10/2002 Ali-Mehenni .......... G01S 7/025
  342/26 R
7,231,300 B1 *  6/2007 Rose, Jr. ................ G01S 13/95
  702/3
(Continued)

FOREIGN PATENT DOCUMENTS

WO     9938028 A1  7/1999
WO    03007016 A1  1/2003
WO 2005040853 A1  5/2005

OTHER PUBLICATIONS

French Preliminary Search Report in FR 1750186, dated Oct. 10, 2017, 2 pages.
(Continued)

*Primary Examiner* — Ricky Go
(74) *Attorney, Agent, or Firm* — Lerner, David, Littenberg, Krumholz & Mentlik, LLP

(57) ABSTRACT

The invention relates to a meteorological technique, and more specifically relates to a method for estimating a precipitation rate, which involves measuring, by means of a bipolar radar, the differential phase and the reflectivity of a radio wave, over a travel radius interval $[r_0, r_1]$ where $r_0$ and $r_1$ are two points of the line of sight, where $r_0$ coincides with a 0° C. isotherm in the case of snowfall, and determining the value(s) of the adjustment parameter(s) of a model of an intercept parameter $N_0^*$ in accordance with r and a condition being the value in $r_0$ of the intercept parameter varying in accordance with the radius and the adjustment parameter(s), which minimise, in the travel radius interval $[r_0, r_1]$, a deviation between the differential phase difference between r and $r_0$ and a function of the reflectivity Z, the condition $N_0^*(r_0)$ and the adjustment parameter(s).

9 Claims, 5 Drawing Sheets

(58) Field of Classification Search
USPC .............................................................. 702/3
See application file for complete search history.

(56) References Cited

U.S. PATENT DOCUMENTS

| | | | | |
|---|---|---|---|---|
| 2004/0201515 A1* | 10/2004 | Testud | ..................... | G01S 7/025 |
| | | | | 342/26 R |
| 2007/0103359 A1* | 5/2007 | Testud | ..................... | G01S 13/95 |
| | | | | 342/26 R |
| 2015/0145717 A1* | 5/2015 | Lim | ......................... | G01S 7/025 |
| | | | | 342/26 R |
| 2018/0372912 A1* | 12/2018 | Oh | ........................... | G01W 1/14 |

OTHER PUBLICATIONS

International Search Report in PCT/EP2018/050470, dated Apr. 3, 2018, 2 pages.

Testud J., S. Oury, P. Amayenc and R. Black, "The concept of 'normalized' distribution to describe raindrop spectra: a tool for cloud physics and cloud remote sensing," Journal of Applied Meteorology, 40, No. 6, pp. 1118-1140, dated Jun. 2001, 23 pages.

\* cited by examiner

METHOD FOR ESTIMATING A PRECIPITATION RATE, IN PARTICULAR FOR RAIN OR SNOW

FIELD OF THE INVENTION

The invention relates to a meteorological technique, and more specifically relates to a method for estimating a precipitation rate, in particular a raswin or snow precipitation rate, by means of radar.

STATE OF THE ART

The measurement of a precipitation rate is usually carried out in situ, for example using a rain gauge. In the case of a snow precipitation measurement, this measurement can be carried out by a heated rain gauge that collects the snowflakes and measures the equivalent melt water height. The rain gauges allow accurately measuring the precipitations in one part of the territory. However, their implementation, for mapping rain or snow precipitations, can be complex and/or expensive. In addition, a precipitation measurement by a rain gauge reports on already fallen precipitations: the precipitation at a given altitude cannot be deduced in a short time before the characteristic time of the precipitation.

For this purpose, a method for measuring a precipitation rate by radar has been developed. Weather radar can measure a map of the reflectivity Z of a transmitted radio signal. Empirical relationships between the reflectivity Z and the rain precipitation rate R, or the snow precipitation rate S, are known. However, these relationships are strongly dependent on the type of precipitations (rain or snow) to measure.

A known empirical relationship between the reflectivity Z and the precipitation rate (R or S) is the following Marshall-Palmer relationship:

$$Z = 200 R^{1.5} \tag{1}$$

This relationship assumes an exponential distribution of the size of the raindrops, for example described by the following formula (2):

$$N(D) = N_0 e^{-\Lambda D} \tag{2}$$

wherein D corresponds to the diameter of the drops and $N_0$ and $\Lambda$ are constants. The term "intercept parameter" refers to the parameter $N_0$ whose value in this model is constant and equal to $0.8 \times 10^7$ m$^{-4}$. However, this parameter can in practice vary in a range covering at least two decades, for example from $0.8 \times 10^6$ m$^{-4}$ to $0.8 \times 10^8$ m$^{-4}$. This variation leads to an uncertainty that is too high in the calculation of R or S.

For this purpose, Testud et al. (Testud J., S. Oury, P. Amayenc and R. Black, 2001: The concept of "normalized" distribution to describe raindrop spectra: a tool for cloud physics and cloud remote sensing, Jour. of Applied Meteorology, 40, n° 6, 1118-1140) have proposed the use of an adimensioned parameter $N_0^*$ characterizing a type of rain (drizzle, light rain, moderate rain, rain shower, etc.).

Testud et al. showed that it was possible to use constant parameters C and d that are valid for any type of rain, according to the following relationship:

$$\frac{R}{N_0^*} = c \cdot \left(\frac{Z}{N_0^*}\right)^d \tag{3}$$

It is also known to transmit simultaneously (or alternatively) in horizontal H and vertical V polarization, and receive separately the copolar signal of each of the polarizations. The term "weather radar with polarization diversity" refers to radar implementing this type of measurement. The differential phase $\Phi_{DP}$ can be measured between the polarizations H and V of the radar signal. The estimation of the precipitation rate is generally faced with the problem of attenuation of the radar wave and that of the natural variability of the type of precipitation (rain or snow).

For this purpose, the patent application WO 99/38 028 describes coherent radar with polarization diversity associated with a processing algorithm called ZPHI (registered trademark of Novimet Company). The ZPHI algorithm is a profiling algorithm that uses as input a measured reflectivity profile Z and a constraint given by a differential phase difference between two points $r_0$ and $r_1$ of a line of sight. From the reflectivity and differential phase measurements, it is possible to determine the specific attenuation K, and the parameter $N_0^*$.

For this purpose, the patent application WO 03007016 describes the implementation of a ZPHI algorithm when the attenuation is negligible. It further describes a relationship for linking the equivalent reflectivity $Z_e$ and the differential phase rate $K_{DP}$, by the formula (4):

$$\frac{K_{DP}}{N_0^*} = a \cdot \left(\frac{Z_e}{N_0^*}\right)^b \tag{4}$$

where a and b are coefficients specified by a diffusion model depending on the type of precipitation (rain or snow). The formula (4) makes it possible to deduce the value of $K_{DP}$ as a function of the parameters a and b according to the following formula (5):

$$K_{DP} = a \cdot N_0^{*(1-b)} \cdot Z_e^b \tag{5}$$

Assuming that $N_0^*$ is constant on a segment comprised between two points $r_0$ and $r_1$ of a line of sight, and assuming an absence of attenuation or a negligible attenuation, it is possible to integrate the formula (5) so as to deduce the value from the estimator $N_0^*$:

$$N_0^* = \left(\frac{\Phi_{DP}(r_2) - \Phi_{DP}(r_1)}{a \int_{r_1}^{r_2} Z^b dr}\right)^{\frac{1}{1-b}} \tag{6}$$

Thus, it is possible to use the value of $N_0^*$ calculated by the formula (6), in a relationship between R and Z described by the formula (3) to estimate a precipitation rate. The use of this measurement method causes errors and/or uncertainties on the calculated precipitation rate.

The patent application WO 2005040853 describes a method for restoring a vertical profile of a snow precipitation from a vertical profile of reflectivity Z. It describes particularly a relationship of proportionality between the ratio of the reflectivity Z to $N_0^*$ and the effective diameter $D_\varphi$ of the snow particles to the power of seven. The effective diameter $D_{100}$ can be calculated by different models of aggregation of the precipitating particles, by integrating on a vertical line a differential equation dependent on $D_\varphi$. It is thus possible to calculate the variations of $N_0^*$ as a function of an altitude considered in a vertical plane using a particle aggregation model.

This method nevertheless requires complex calculations (resolutions of differential equations) which may be incompatible with a measurement of the precipitation rate within large radii, typically in the order of 100 km, in a limited time, for example in less than 10 minutes.

There is therefore a need for an accurate and rapid estimation of the precipitations, whatever their types, in the field of the weather forecast and more particularly in applications related to the management of watersheds or river basins, to the management of road networks or even for airports.

SUMMARY OF THE INVENTION

An object of the invention is to propose a solution for efficiently estimating a rain or snow precipitation rate, in a volume defined by a space around radar.

Particularly, another object of the invention is to propose a method for estimating more quickly a relevant model of $N_0^*$ as a function of the distance to the radar.

According to one aspect, the invention proposes a method for estimating a precipitation rate in which the following steps are implemented:

a) measuring, by means of bipolar radar, the differential phase and the reflectivity Z of a radio wave, according to at least one of the polarizations of said radar, over a path radius interval $[r_0, r_1]$ of a line of sight of the radar where $r_0$ and $r_1$ are two points of the line of sight, $r_0$ coinciding with a 0° C. isotherm in the case of snow precipitations;

b) determining the value(s) of the adjustment parameter(s) of a model of an intercept parameter $N_0^*$ as a function of r and of a condition $N_0^*(r_0)$, where $N_0^*(r_0)$ is the value in $r_0$ of the intercept parameter $N_0^*$ varying as a function of the radius r and of the adjustment parameter(s), the adjustment parameter(s) and the minimizing condition in the path radius interval $[r_0, r_1]$ a deviation given by the relationship:

$$\Phi_{DP}(r) - \Phi_{DP}(r_0) - G(\int_{r_0}^{r} a\{N_0^*(r_0, E, u)\}^{1-b} Z^b du)$$

where $\Phi_{DP}$ is the differential phase, G is a function adapted to the type of precipitation, a and b are coefficients adapted to the type of precipitation and E is a set comprising the adjustment parameter(s), by varying the condition $N_0^*(r_0)$ and the adjustment parameter(s) to minimize the deviation;

c) calculating a precipitation rate as a function of the reflectivity Z measured during step a) and of an intercept parameter curve between $r_0$ and $r_1$, which corresponds to the adjustment parameter(s) determined during step b).

Advantageously, the direction of the radius is oblique with respect to the surface of the earth.

Advantageously, the deviation is minimized by the least squares method.

Advantageously, the method is a method for estimating a snow precipitation rate in which the function G is an identity function.

Advantageously, the function G is a function taking into account the attenuation in the rain.

Advantageously, the radius $r_0$ coincides with a 0° C. isotherm.

Advantageously, when the ground is at a temperature below 0° C., the radius $r_0$ coincides with a point on the ground.

Advantageously, a minimization processing by the conjugate gradient method is implemented to determine a condition $N_0^*$ and an adjustment parameter.

Advantageously, during step b), the intercept parameter $N_0^*$ is modeled by a linear function, a parabolic function or a tangent arc function, or a combination thereof.

The invention also proposes a computer program product comprising instructions adapted to the implementation of a method proposed by the invention.

PRESENTATION OF THE DRAWINGS

Other characteristics and advantages will further emerge from the following description, which is purely illustrative and non-limiting, and should be read in relation to the appended figures, among which:

DEFINITION

The term "oblique" refers to a direction different from a vertical or horizontal direction relative to the plane locally defined by the earth at the location of the radar.

Theoretical Elements

It is possible to apply the ZPHI algorithm taking into account the variation of $N_0^*$ with the altitude h. This variation can be calculated by a model of aggregation of the snow particles during their fall.

A particle diffusion model can take into account the parameters of density of the particles, as well as the parameters of flattening and velocity of the particles during their fall.

The density of the snow (or ice) particle is modeled by assimilating the particles to flattened spheroids. A power relationship can be established between their density and their effective diameter (or characteristic diameter) $D_\varphi$ according to formula (7):

$$\rho = \rho_i D_{99}^{-\alpha}/D_0^{-\alpha} \tag{13}$$

for $D_\varphi$ strictly greater than $D_0$ and $$\rho = \rho_i \tag{14}$$

for $D_\varphi$ less than or equal to $D_0$, where $\rho_i$ corresponds to the density of the ice, α is a constant (typically comprised between 0.7 and 1.1) and $D_0$ is the diameter of the particle for which the particle has no air. $D_0$ may be comprised between 50 and 200 μm and preferably equal to 100 μm.

The flattening of the ice particles is modeled by considering an axial ratio ε equal to 0.2 for $D_\varphi$ less than 200 μm, an axial ratio ε equal to 0.8 for $D_\varphi$ greater than 1 mm and an axial ratio that varies linearly between the bounds defined by $D_\varphi$=200 μm and $D_\varphi$=1 mm.

The falling speed of the particles is modeled by a power law defined by the following formula (15):

$$V_t = A_v \cdot D_\varphi^{B_v} \quad (15)$$

where $V_t$ is the falling speed of the particles, $A_v$ and $B_v$ are constants calculated as a function of the Reynolds coefficients, of the acceleration of the gravity g, of the density of air $\rho_a$ and of its kinematic viscosity ν.

The particle size distribution chosen is an exponential distribution law in melt equivalent diameter $D_{eq}$, defined by the following formula (16):

$$N(D_{eq}) = N_0 \exp(-\Lambda D_{eq}) \quad (16)$$

Figure 1:
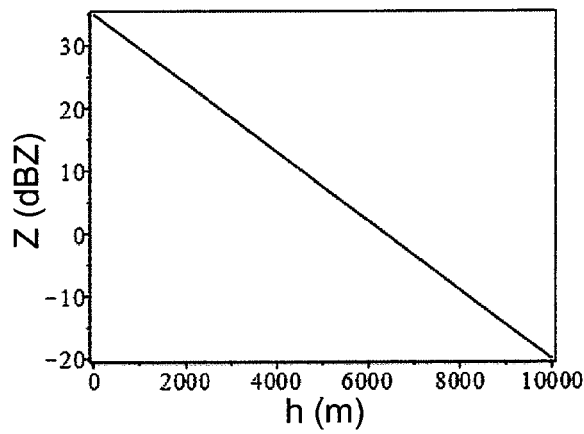
FIG. 1 illustrates a profile of the reflectivity Z measured as a function of the altitude h in a vertical plane.

FIG. 1 illustrates a profile of the reflectivity Z measured as a function of the altitude h in a vertical plane. It is known to invert the measurement of Z in a vertical plane by a diffusion model taking into account the aggregation of snow particles.

Figure 2:
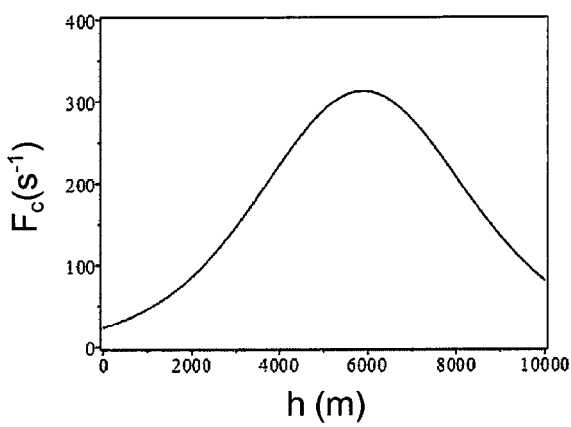
FIG. 2 illustrates a simulation of the collision frequency $F_c$ of the snow particles in a vertical plane as a function of the altitude h.

FIG. 2 illustrates a simulation of the collision frequency $F_c$ of the snow particles in a vertical plane as a function of the altitude h considering the aggregation of the snow particles.

Figure 3:
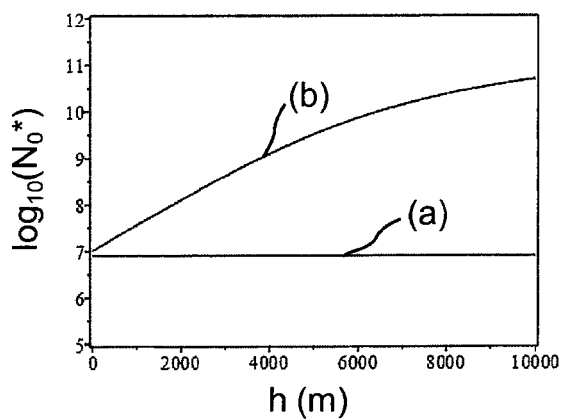
FIG. 3 illustrates a simulation of the value of $N_0^*$ as a function of the altitude h.

FIG. 3 illustrates a simulation of the value of $N_0^*$ as a function of the altitude h according to methods known from the prior art. Particularly, the curve (a) corresponds to a constant value of $N_0^*$, and the curve (b) corresponds to a simulation of the value of $N_0^*$ taking into account the aggregation of the snow particles in a vertical plane.

Figure 4:
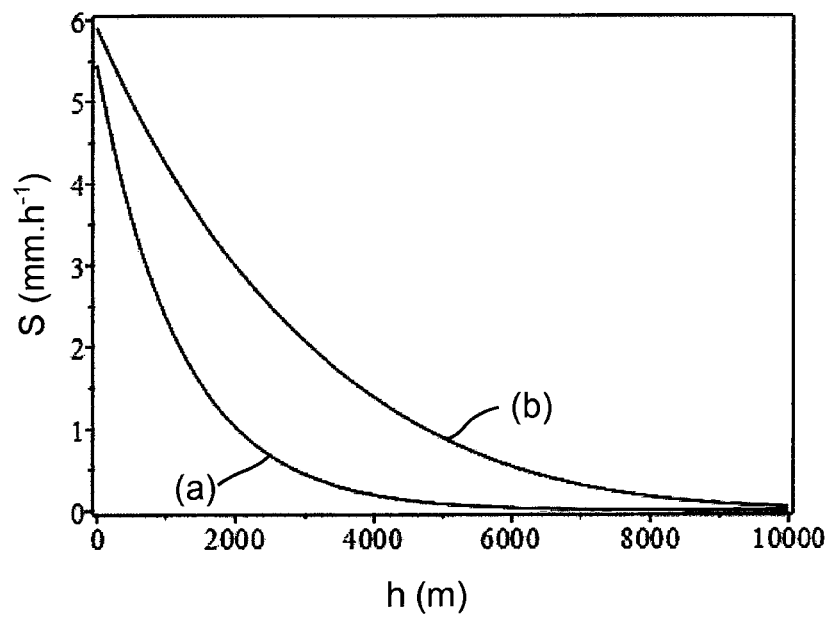
FIG. 4 illustrates a simulation of the estimation of a snow precipitation rate as a function of their diameter.

FIG. 4 illustrates a simulation of the estimation of the snow precipitation rate as a function of the altitude h in a vertical plane. The curve (a) corresponds to an estimation of the precipitation rate resulting from the inversion of a measurement Z taking into account a model in which $N_0^*$ is constant. The curve (b) corresponds to an estimate of the snow precipitation rate, in a vertical plane, resulting from the inversion of a measurement of Z taking into account a model in which $N_0^*$ depends on the aggregation of snow particles.

Figure 5:
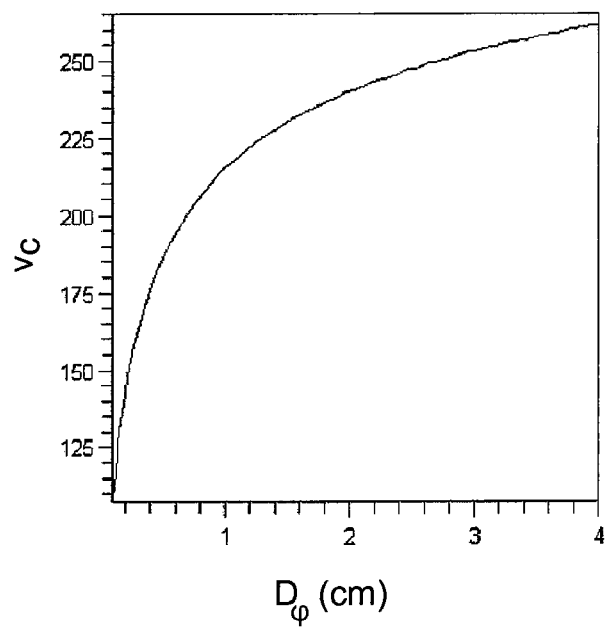
FIG. 5 illustrates a simulation of the variation of the snowflake falling speed as a function of the altitude in a vertical plane.

FIG. 5 illustrates a simulation of the falling speed $V_C$ as a function of an effective diameter $D_\varphi$ of a snow particle (or a snowflake). The speed is simulated at an altitude of 5000 m, by a falling speed law of an aggregation model, in a vertical plane.

Figure 6:
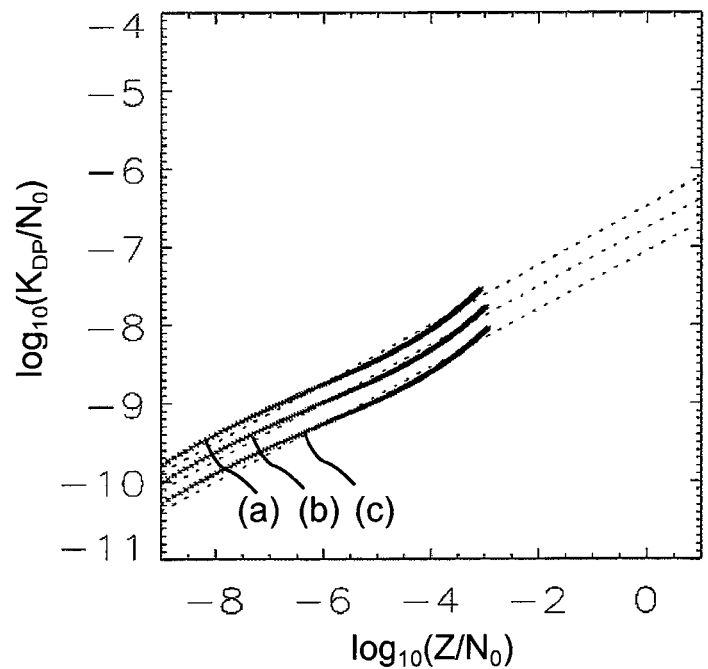
FIG. 6 illustrates a diffusion model making it possible to relate the normalized differential phase rate to the normalized reflectivity.

FIG. 6 illustrates a diffusion model for relating the normalized differential phase rate $K_{DP}/N_0$ to the normalized reflectivity $Z/N_0$. The curves (a), (b) and (c) of FIG. 6 illustrate the variations in the ratio between the differential phase rate $K_{DP}$ and $N_0$ as a function of the ratio between the reflectivity Z and $N_0$, for radio waves belonging respectively to the frequency range corresponding to the bands X, C and S.

The curves (a), (b) and (c) can be adjusted to straight lines in log-log representation. Thus, the variations of $N_0^*$ according to an aggregation model can verify the formulas (4) and (5).

Figure 7:
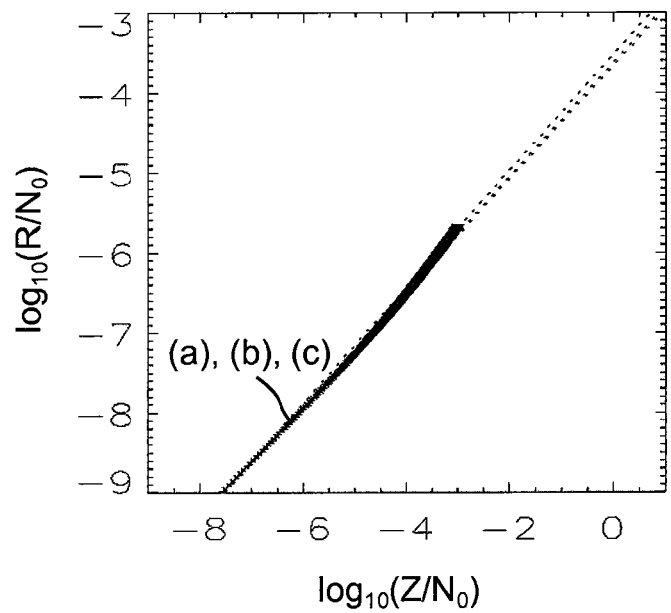
FIG. 7 illustrates a diffusion model making it possible to relate the normalized precipitation rate to the normalized reflectivity.

FIG. 7 illustrates a diffusion model for relating the normalized precipitation rate $R/N_0$ to the normalized reflectivity $Z/N_0$. The aggregation model used in the simulation illustrated in FIG. 7 is the same as in FIG. 6. The curves (a), (b) and (c) can be adjusted to straight lines in a log-log representation. Thus the variations of $N_0^*$ according to an aggregation model can verify the formula (3).

Figure 8:
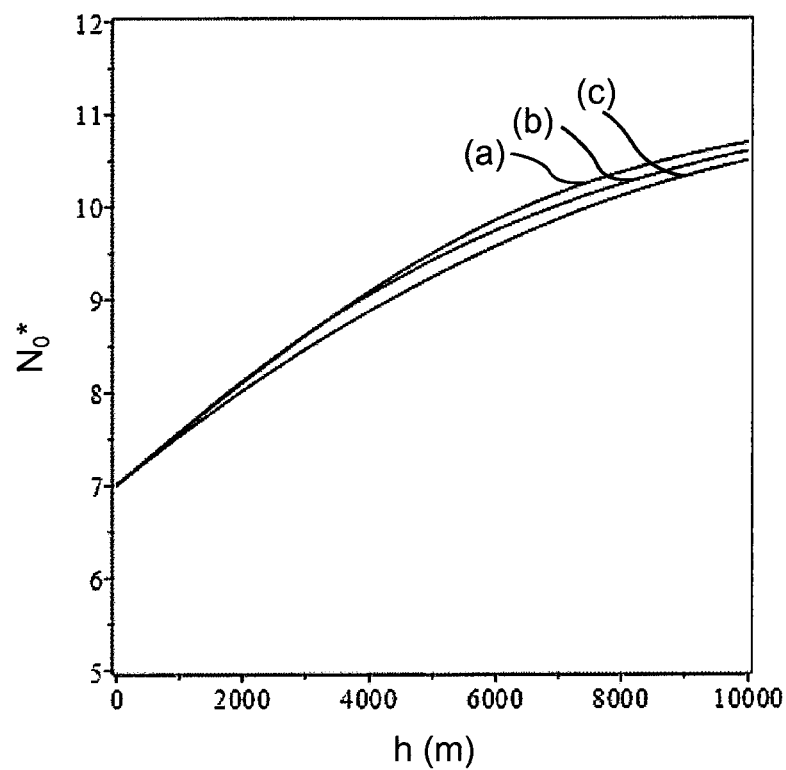
FIG. 8 illustrates simulations of the variation of $N_0^*$ as a function of the altitude for different models.

FIG. 8 illustrates simulations of the variation of $N_0^*$ as a function of the altitude h for different analytical models and for the aggregation model. The curve (a) in FIG. 8 illustrates the variation of $N_0^*$ as a function of the altitude h according to the particle aggregation model described above. The variation of $N_0^*$ as a function of h can be described by a known analytical function, and be adjustable according to at least one parameter. For example, the curve (c) in FIG. 8 illustrates a parabolic variation of $N_0^*$ as a function of h according to the following formula (17):

$$[\text{Log}_{10}(N_0^*)](h) = [\text{Log}_{10}(N_0^*)](h_0) + A(h-h_0) - B(h-h_0)^2 \quad (17)$$

where $h_0$ a height selected from a point coinciding with a 0° C. isotherm and a point on the ground (in the case where the ground temperature is below 0° C.), and A and B are two constant adjustment parameters. The adjustment parameters A and B are, for example, chosen equal respectively to $5.5 \times 10^{-4}$ m$^{-1}$ and $-2 \times 10^{-8}$ m$^{-2}$.

The curve (b) of FIG. 8 illustrates a tangent arc variation of $N_0^*$ as a function of h according to the following formula (18):

$$[\text{Log}_{10}(N_0^*)](h) = [\text{Log}_{10}(N_0^*)](h_0) + A \cdot \arctan\{(h-h_0)/B\} \quad (18)$$

where A and B are two constant adjustment parameters. The parameters A and B are for example chosen in this case equal respectively to 3.5 and 6000 m.

In addition, a variation of $N_0^*$ as a function of h can be modeled by a linear function according to the following formula (19):

$$[\text{Log}_{10}(N_0^*)](h) = [\text{Log}_{10}(N_0^*)](h_0) + A(h-h_0) \quad (19)$$

Particularly, the models of the formulas (17), (18) and (19) are valid by replacing h by r, r corresponding to the distance to the radar on an oblique line of sight. Thus, the variation of $N_0^*$ as a function of r can be described by a known analytical function, and is adjustable according to at least one adjustment parameter of a model of the intercept parameter $N_0^*$ as a function of r. This variation model of $N_0^*$ is predefined and may for example correspond to a parabolic variation of $N_0^*$ as in the formula 17, tangential arc variation in the formula 18 or linear variation in the formula 19.

It is possible to integrate the formula (5) between $r_0$ (defined by a radius corresponding to a point of the space chosen from a point coinciding with an isotherm of 0° C. and a point on the ground in the case where the ground temperature is below 0° C.) and $r_1$ (in the precipitation). For example, during rain precipitations, a radius $r_0$ corresponding to a point on the ground is preferably chosen. During snow precipitations, a radius $r_0$ corresponding to a point coinciding with a 0° C. isotherm is preferably chosen.

Example of Implementation

Figure 9:
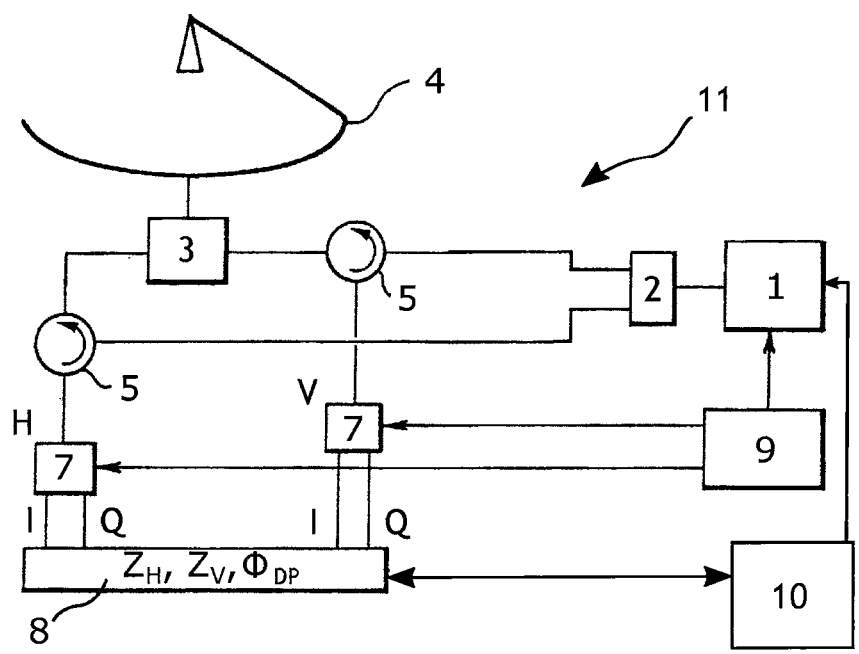
FIG. 9 illustrates bipolar radar adapted to the implementation of a method according to the invention.

FIG. 9 illustrates bipolar radar 11. The bipolar radar 11 can comprise:
- a transmitter 1;
- a power divider 2 to 3 dB receiving the output signal of the transmitter 1;
- a mode extractor (or orthomode) 3 connected by two channels H and V to the outputs of a power divider 2;
- a horn antenna 4 transmitting or receiving the two polarizations H and V;
- circulators 5 (filtering T-squares) interposed, on the H and V channels, between the extractor mode 3 and the power divider 2;

receiving means 7 connected, for the H and V channels, to the circulators 5;

an oscillator 9 which synchronizes the transmitter 1 and the receiving means 7;

means 8 for sampling, and then processing the outputs I and Q of these receiving means 7, the processing means 8 enabling the determination from the parameters $Z_H$, $Z_V$ and the differential phase $\Phi_{DP}$, which verify in complex notation $Z_{H,V} = [I_{H,V}^2 + Q_{H,V}^2]^{1/2}$ and $\Phi_{DP} = \arg[(I_H + iQ_H)(I_V - iQ_V)]$, where $I_{H,V}$ and $Q_{H,V}$ are values obtained by sampling of the outputs I and Q of the channels H and V.

The processing means 8 can include analog-digital converters, making it possible to sample the outputs I and Q. The processing means 8 can be connected to a computer 10 making it possible to process and store the outputs I, Q, $Z_H$, $Z_V$ and/or $\Phi_{DP}$. The computer 10 comprises at least one calculator and at least one memory. The computer 10 also makes it possible to control other elements of the bipolar radar, such as the transmitter 1.

Figure 10:
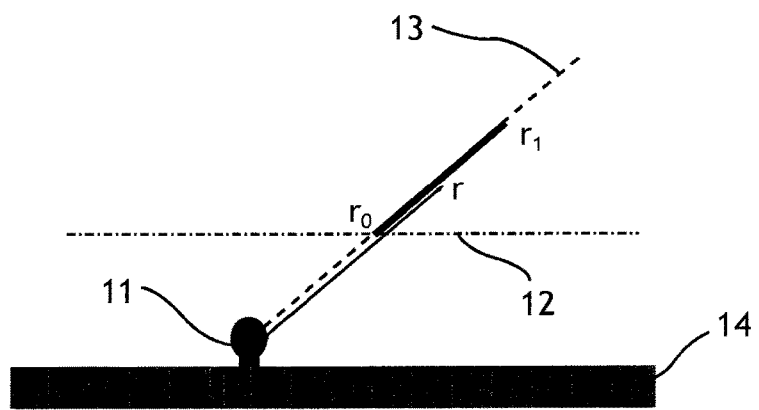
FIG. 10 illustrates a line of sight of the bipolar radar.

FIG. 10 illustrates a line of sight of the bipolar radar 11. The plane illustrated in FIG. 10 is vertical. The bipolar radar 11 is arranged on a horizontal plane locally defined by the earth 14. Part of the atmosphere is delimited by a 0° C. isotherm 12: the 0° C. isotherm corresponds for example to a horizontal plane in the atmosphere, as illustrated in FIG. 10. The part of the atmosphere delimited by the 0° C. isotherm and whose temperature is less than or equal to 0° C. (that is, the portion above the 0° C. isotherm in FIG. 10) comprises a portion of the line of sight 13. The line of sight 13 may be oblique, and thus define a non-zero angle and different from 90° C. with the plan locally defined by the earth 14. The points of the line of sight 13 are distant from a radius r of the bipolar radar 11. The radius $r_0$ corresponds to a point of the line of sight coinciding with the 0° C. isotherm. The radius $r_1$ corresponds to a point of the line of sight within the area of the atmosphere whose temperature is less than or equal to 0° C. The portion of the line of sight illustrated in thick lines corresponds to the path radius interval $[r_0, r_1]$ of the line of sight 13.

Figure 11:
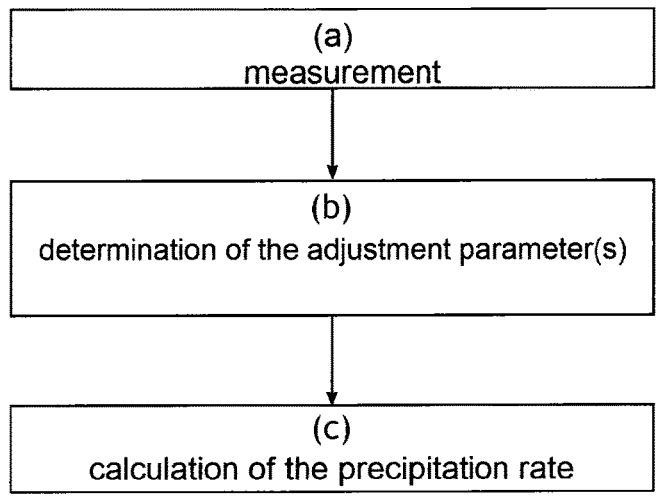
FIG. 11 illustrates a method according to the invention.

FIG. 11 illustrates steps of a method for estimating a precipitation rate from measurements obtained by the bipolar radar 11.

During the measuring step a), the radar 11 measures the differential phase $\Phi_{DP}$ and the reflectivity Z of a radio wave according to at least one of the polarizations of the radar (for example the signals $Z_H$ and $Z_V$ at the output of the processing means 8). These measurements can be implemented using the bipolar radar 11 corresponding to FIG. 9.

The differential phase $\Phi_{DP}$ and the reflectivity Z are measured during step a) over an interval $[r_0, r_1]$ of path radius r relative to said radar.

The user can choose beforehand a model of the intercept parameter $N_0^*$, used by the method, using the interface of the computer. This model is a function of r and of the adjustment parameter(s). It can be defined by the value of $N_0^*$ at the point $r_0$, designated by the condition $N_0^*(r_0)$, and comprises at least one (additional) adjustment parameter. FIG. 8 illustrates adapted models of $N_0^*(r)$.

During the determination step b), the processing mean(s) 8 and/or the computer 10 determine at least the condition $N_0^*(r_0)$ and an adjustment parameter or a set of adjustment parameters E of the variation of $N_0^*$ with r according to a predefined variation model, for example a linear, parabolic or tangential arc model. By "model" is meant an analytical model in which the adjustment parameter(s) is/are not set beforehand. Particularly, the value(s) of the adjustment parameter(s) is/are determined. The condition $N_0^*(r_0)$ and the adjustment parameter(s) is/are determined by digitally minimizing in the path radius interval $[r_0, r_1]$ the deviation between:

the differential phase difference $\Phi_{DP}$ between r and $r_0$ measured during step a) of the method, and a function adapted to the type of precipitation of the reflectivity Z measured during step a) and of the condition $N_0^*(r_0)$ and of the adjustment parameter(s).

The minimized deviation during step b) can be defined by the following formula (20):

$$\Phi_{DP}(r) - \Phi_{DP}(r_0) - G(\int_{r_0}^{r} a\{N_{0*}(r_0, E, u)\}^{1-b} Z^b du) \quad (20)$$

where G is a predefined function adapted to the type of precipitation (for example adapted to the attenuation caused by a precipitation), a and b are coefficients adapted to the type of precipitation and E is a set comprising each parameter of the model of $N_0^*$ as a function of r.

The deviation can be advantageously minimized during step b) by the processing means 8 and/or the computer 10 by using for example the least squares method and by digitally minimizing, in the path radius interval $[r_0, r_1]$, the following functional F:

$$F = \int_{r_0}^{r_1} \{\Phi_{DP}(r) - \Phi_{DP}(r_0) - G(\int_{r_0}^{r} a\{N_0^*(r_0, E, u)\}^{1-b} Z^b du)\}^2 dr \quad (21)$$

During step c) of calculating the precipitation rate, the processing mean(s) 8 and/or the computer 10 determine or calculate a precipitation rate R, S as a function of the reflectivity Z measured during step a) and of an intercept parameter curve between $r_1$ and $r_0$, which corresponds to the adjustment parameter(s) determined during step b). The precipitation rate can be digitally calculated using the normalized formula (3).

During snow precipitations, the attenuation of the radio wave can be neglected. The function G can be replaced by an identity function.

The power relationship according to the formula (22) not taking into account the attenuation, can be integrated:

$$K_{DP} = a N_0^{*1-b} Z^b \quad (22)$$

The user having previously chosen the analytical models corresponding to the formulas (17), (18) and (19), the formulas (23), (24) and (25), defining the core of the functional F, are respectively obtained after integration:

$$\Phi_{DP}(r) - \Phi_{DP}(r_0) = \{N_0^*(r_0)\}^{1-b} \int_{r_0}^{r} a Z(u)^b 10^{(1-b)\{A(u-r_0) - B(u-r_0)^2\}} du \quad (23)$$

$$\Phi_{DP}(r) - \Phi_{DP}(r_0) = \{N_0^*(r_0)\}^{1-b} \int_{r_0}^{r} a Z(u)^b 10^{(1-b)A \cdot \arctan\{(u-r_0)/B\}} du \quad (24)$$

$$\Phi_{DP}(r) - \Phi_{DP}(r_0) = \{N_0^*(r_0)\}^{1-b} \int_{r_0}^{r} a Z(u)^b 10^{(1-b)A(u-r_0)} du \quad (25)$$

A step of minimizing the deviation defined in step b) of the method may be advantageously carried out by the least squares method. A deviation can be minimized during step b) of a method for estimating a precipitation rate and can be written in the form of the following formula (26) in the case of a parabolic model of $N_0^*$ with two adjustment parameters A and B:

$$\int_{r_0}^{r_1} \{\Phi_{DP}(r) - \Phi_{DP}(r_0) - \{N_0^*(r_0)\}^{1-b} \int_{r_0}^{r} a Z(u)^b 10^{(1-b)\{A(u-r_0) - B(u-r_0)^2\}} du\}^2 dr_1 \quad (26)$$

The step b) of determining an adjustment parameter can be performed from the following bound conditions:

$$\frac{\partial F}{\partial N_0^*(r_0)} = 0 \quad (27)$$

$$\frac{\partial F}{\partial A} = 0 \text{ and} \quad (28)$$

$$\frac{\partial F}{\partial B} = 0. \quad (29)$$

The step b) of determining an adjustment parameter can be advantageously performed using the conjugate gradient method. Each parameter of the set E of adjustment parameters and the condition $N_0^*(r_0)$ can thus be determined by the processing mean(s) 8 and/or by the computer 10.

During rain precipitations, the attenuation of the radio wave is taken into account. The specific attenuation can be defined by the following formula (30):

$$K = \gamma K_{DP} \quad (30)$$

Thus, a deviation F can be written, considering a model of parabolic variation of $N_0^*$ as a function of r according to the following formula (31):

$$F = \int_{r_0}^{r_1} \left\{ \frac{10}{b} \log_{10} \left( \begin{array}{c} \Phi_{DP}(r) - \Phi_{DP}(r_0) + \\ \left( \frac{1}{\gamma} - 0.46 b \{N_0^*(r_0)\}^{1-b} \int_{r_0}^{r} a Z_{att}(u)^b \right. \\ \left. 10^{(1-b)\{A(u-r_0) - B(u-r_0)^2\}} du \right) \end{array} \right) \right\}^2 dr \quad (31)$$

The deviation can be minimized by minimizing the function F in step b) of the method by varying the condition $N_0^*(r0)$ and the adjustment parameters A and B.

Figure 12:
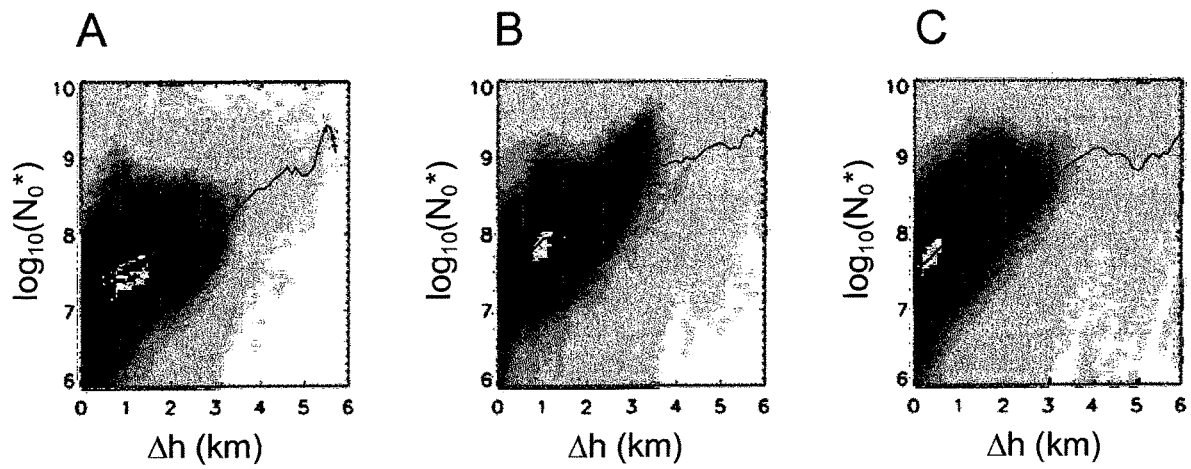
FIG. 12 illustrates experimental measurements of $N_0^*$ as a function of the altitude with respect to the 0° C. isotherm.

FIG. 12 illustrates experimental measurements of $N_0^*$ as a function of the altitude with respect to the 0° C. isotherm ($\Delta h$). Panels A, B and C in FIG. 3 illustrate daily measurements (represented by the gray portions) of $N_0^*$ on a decimal logarithmic scale. These data are obtained in December, with a Hydrix radar, at Mount Vial, in France. The angle between the measuring beam and the surface of the earth is of 2.4°. The average of the measurements of $N_0^*$ is represented by a black curve in each of the panels.

The invention claimed is:

1. A method for estimating a precipitation rate, the method comprising:
   a) receiving, at a receiver of a bipolar radar device connected to an antenna of the bipolar radar device, a radio wave reflected by precipitation in a volume of space around the antenna;
   b) measuring, at one or more processors connected to the receiver, a differential phase and a reflectivity Z of the radio wave, according to at least one polarization of said radar, over a path radius interval $[r_0, r_1]$ of a line of sight of the radar where $r_0$ and $r_1$ are two points of the line of sight, wherein when estimating a precipitation rate of snow, $r_0$ coincides with a 0° C. isotherm;
   c) determining, at the one or more processors, values of one or more adjustment parameters of a model of an intercept parameter $N_0^*$ as a function of a radius r that corresponds to a distance to the radar on an oblique line of sight and a condition $N_0^*(r_0)$, wherein $N_0^*(r_0)$ is a value of the intercept parameter $N_0^*$ at point $r_0$ of the radius, wherein values of $N_0^*(r_0)$ and the one or more adjustment parameters are determined so as to minimize a deviation of:

$$\Phi_{DP}(r) - \Phi_{DP}(r_0) - G(\int_{r_0}^{r} a\{N_0^*(r_0, E, u)\}^{1-b} Z^b du)$$

in the path radius interval $[r_0, r_1]$, wherein $\Phi_{DP}$ is the differential phase, G is a function adapted to a type of precipitation being estimated, a and b are coefficients adapted to the type of precipitation being estimated, and E is a set comprising the one or more adjustment parameters; and
   d) calculating, at the one or more processors, a precipitation rate as a function of the reflectivity Z measured during step b) and of an intercept parameter curve between $r_1$ and $r_0$, which corresponds to the one or more adjustment parameters determined during step c).

2. The method of claim 1 wherein a direction of the radius is oblique with respect to Earth's surface.

3. The method of claim 1 wherein the deviation is minimized according to a least squares method.

4. The method of claim 1, wherein the method is for estimating a precipitation rate of snow, wherein the function G is an identity function.

5. The method of claim 1, wherein the method is for estimating a precipitation rate of rain, wherein the function G is a function taking into account attenuation of the radio wave caused by the rain.

6. The method of claim 1, wherein when a ground temperature is below 0° C., $r_0$ coincides with a point on the ground.

7. The method of claim 1, wherein determining values of the one or more adjustment parameters and the condition $N_0^*(r_0)$ is performed using a conjugate gradient method.

8. The method of claim 1, wherein during step c), the intercept parameter $N_0^*$ is modeled by a linear function, a parabolic function, a tangent arc function, or a combination thereof.

9. A non-transitory computer-readable medium having programmed thereon instructions adapted to perform the method of claim 1.

* * * * *